(12) United States Patent
Borland et al.

(10) Patent No.: US 12,423,723 B2
(45) Date of Patent: *Sep. 23, 2025

(54) METHODS AND APPARATUS TO MONITOR MEDIA PRESENTATIONS

(71) Applicant: The Nielsen Company (US), LLC, New York, NY (US)

(72) Inventors: Robert Peter Borland, Palm Harbor, FL (US); Jonathon Brett Rubin, Tampa, FL (US); Anthony B. Stringer, St. Petersburg, FL (US); Adam Schenker, Tampa, FL (US); Shailendra Paranjape, Lutz, FL (US)

(73) Assignee: The Nielsen Company (US), LLC, New York, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/962,702

(22) Filed: Oct. 10, 2022

(65) Prior Publication Data

US 2023/0051984 A1   Feb. 16, 2023

Related U.S. Application Data

(63) Continuation of application No. 17/073,098, filed on Oct. 16, 2020, now Pat. No. 11,468,458, which is a
(Continued)

(51) Int. Cl.
*G06Q 30/0204* (2023.01)
*G06Q 30/0201* (2023.01)
(Continued)

(52) U.S. Cl.
CPC ..... *G06Q 30/0204* (2013.01); *G06Q 30/0201* (2013.01); *H04L 67/02* (2013.01); *H04L 67/306* (2013.01)

(58) Field of Classification Search
CPC ............ G06Q 30/0204; G06Q 30/0201; H04L 67/02; H04L 67/306; H04L 63/0428; H04L 65/60; H04L 67/025; G06F 16/95
(Continued)

(56) References Cited

U.S. PATENT DOCUMENTS

| 7,720,723 | B2 * | 5/2010 | Dicker | G06Q 30/0633 |
| | | | | 705/14.51 |
| 7,921,036 | B1 * | 4/2011 | Sharma | G06Q 20/3674 |
| | | | | 705/52 |

(Continued)

OTHER PUBLICATIONS

Wamu, About The Panelists, 2009 (Year: 2009).*
European commission, Opinion Feb. 2010 on online behavioural advertising, 2010 (Year: 2010).*

*Primary Examiner* — Tarek Elchanti

(57) ABSTRACT

Methods, apparatus, systems and articles of manufacture to monitor media presentations are disclosed. An example tangible computer readable storage medium includes instructions that, when executed, cause a machine to at least instrument media with monitoring instructions; provide the instrumented media to a media device via a hypertext transport secure protocol, the monitoring instructions to cause the media device to request a panelist identifier associated with the media device; detect a media event based on an action of the media device; determine media-identifying information based on the media event; and generate a record including the media-identifying information and the panelist identifier.

17 Claims, 7 Drawing Sheets

Related U.S. Application Data continuation of application No. 14/489,390, filed on Sep. 17, 2014, now Pat. No. 10,810,607.

(51) Int. Cl.
*H04L 67/02* (2022.01)
*H04L 67/306* (2022.01)

(58) Field of Classification Search
USPC .............................. 705/7.33, 14.51; 709/224
See application file for complete search history.

(56) References Cited

U.S. PATENT DOCUMENTS

| | | | |
|---|---|---|---|
| 9,635,404 B2 * | 4/2017 | McMillan | H04N 21/6175 |
| 2009/0217315 A1 * | 8/2009 | Malik | H04N 7/181 |
| | | | 725/9 |
| 2011/0178864 A1 * | 7/2011 | Error | G06Q 40/00 |
| | | | 705/14.41 |
| 2011/0293148 A1 * | 12/2011 | Kobayashi | G06V 20/53 |
| | | | 382/107 |
| 2012/0030006 A1 * | 2/2012 | Yoder | G06Q 30/0207 |
| | | | 705/14.41 |
| 2014/0280888 A1 * | 9/2014 | McMillan | G06Q 30/02 |
| | | | 709/224 |

* cited by examiner

METHODS AND APPARATUS TO MONITOR MEDIA PRESENTATIONS

CROSS REFERENCE TO RELATED APPLICATIONS

This patent arises from a continuation of U.S. patent application Ser. No. 17/073,098, now U.S. Pat. No. 11,468,458, which was filed on Oct. 16, 2020, which was a continuation of U.S. patent application Ser. No. 14/489,390, now U.S. Pat. No. 10,810,607, which was filed on Sep. 17, 2014. U.S. patent application Ser. No. 14/489,390 and U.S. patent application Ser. No. 17/073,098 are hereby incorporated herein by reference in their entirety. Priority to U.S. patent application Ser. No. 14/489,390 and U.S. patent application Ser. No. 17/073,098 is hereby claimed.

FIELD OF THE DISCLOSURE

This disclosure relates generally to audience measurement, and, more particularly, to methods and apparatus to monitor media presentations.

BACKGROUND

Media providers and/or other entities such as, for example, advertising companies, broadcast networks, etc. are often interested in the viewing, listening, and/or media behavior of audience members and/or the public in general. To monitor these behavior, an audience measurement company may enlist panelists (e.g., persons agreeing to be monitored) to cooperate in an audience measurement study. The media usage and/or exposure habits of these panelists as well as demographic data about the panelists is collected and used to statistically determine the size and demographics of a larger audience of interest.

In recent years, security of online communications has increased in importance due to privacy concerns, financial data concerns, etc. One method of providing security to online transactions is the use of encryption. In particular, encrypted online communication protocols (e.g., hypertext transport secure (HTTPS)) have grown in popularity. Such protocols provide end-to-end encryption to prevent a third party from intercepting and observing the contents of communications.

To monitor encrypted media communications, audience measurements entities often employ tools that interact with media presentation applications that reveal information about the media. For example, an extension may be added to a web browser to gather information about webpages and other media and to report the information to a panelist meter executing on the same media presentation (e.g., computer) as the web browser. Because the extension is executing within the browser, the extension has access to the decrypted contents of encrypted media (e.g., media transferred using HTTPS).

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
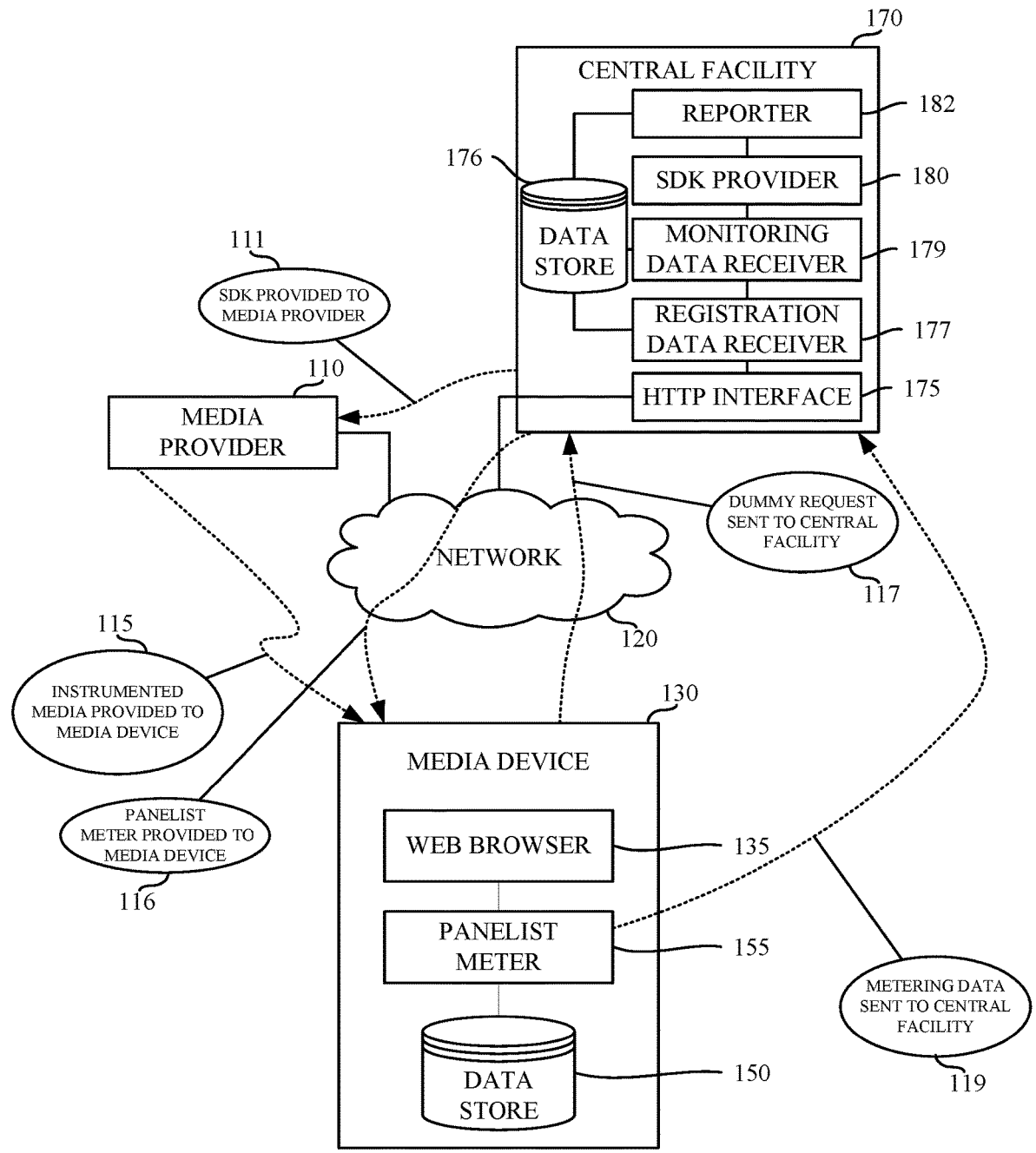
FIG. 1 is a block diagram of an example system constructed in accordance with the teachings of this disclosure to monitor media presentations and shown in an example environment of use.

Media monitoring using browser extensions can provide reliable results, but browser extension operation is subject to interruption. For example, a browser extension may become inoperative following an update of the browser extension, may be disabled by security software, may be accidently disabled by a user, etc. Methods and apparatus disclosed herein facilitate monitoring of online media that may be used in addition to or as an alternative to browser extension metering.

As used herein, the term "media" includes any type of content and/or advertisement delivered via any type of distribution medium. Thus media includes television programming or advertisements, radio programming or advertisements, movies, web sites, streaming media, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation® 3), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a panelist identifier, a username, etc.).

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

FIG. 1 is a block diagram of an example system constructed in accordance with the teachings of this disclosure to monitor media shown operating in connection with an example network in an example environment of use. The example system of FIG. 1 includes a media device 130 and a central facility 170. The media device 130 of the illustrated example includes a web browser 135, a media device data store 150, and a panelist meter 155. The example central facility 170 of the illustrated example of FIG. 1 includes an HTTP interface 175, a registration data receiver 177, a data store 176, a monitoring data receiver 179, a software development kit (SDK) provider, and a reporter 182. The example web browser 135 of the illustrated example communicates via a network 120 to retrieve media from a media provider 110. The media of the illustrated example is instrumented with monitoring functionality to transmit monitoring information about the media to the example central facility 170.

The example media provider 110 of the illustrated example of FIG. 1 includes one or more servers providing Internet media (e.g., web pages, audio, video, images, etc.). The example media provider 110 of FIG. 1 may be implemented by any provider(s) of media such as a digital media broadcaster, multicaster, or unicaster (e.g., a cable television service, a fiber-optic television service, an IPTV provider, etc.) and/or an on-demand digital media provider (e.g., an Internet streaming video and/or audio service such as Netflix®, YouTube®, Hulu®, Pandora®, Last.fm®, etc.), a web page (e.g., an online store such as Amazon.com®), and/or any other provider of media. Additionally or alternatively, the example media provider 110 may not be an Internet provider. For example, the media provider may be on a private, a virtual private, and/or semi-private network (e.g., a LAN).

The example network 120 of the illustrated example of FIG. 1 is a wide area network (WAN) such as the Internet. However, in some examples, local networks may additionally or alternatively be used. For example, multiple networks (e.g., a cellular network, an Ethernet network, etc.) may be utilized to implement the example network 120 of FIG. 1.

The example media device 130 of the illustrated example shown in FIG. 1 is a device that retrieves media from the media provider 110 for presentation. In some examples, the media device 130 is capable of directly presenting media (e.g., via a display) while, in other examples, the media device 130 presents the media on separate media presentation equipment (e.g., speakers, a display, etc.). Thus, as used herein "media devices" may or may not be able to present media without assistance from a second device. Media devices are typically consumer electronics. For example, the media device 130 of the illustrated example is a personal computer such as a laptop computer, and thus, is capable of directly presenting media (e.g., via an integrated and/or connected display and speakers). While in the illustrated example, a personal computer is shown, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The web browser 135 of the illustrated example of FIG. 1 is an application that requests, receives, and presents media (e.g., webpages). For example, the web browser 135 of the illustrated example downloads instrumented media from the example media provider 110 via the example network 120. When the web browser 135 presents the instrumented media, monitoring instructions (e.g., JavaScript instructions) embedded in, linked to, or otherwise associated with the instrumented media cause monitoring information to be collected and provided to the central facility 170. In some examples, the web browser 135 is also instrumented to include monitoring functionality provided by the monitoring entity via (e.g., a browser extension). In some examples, the monitoring instructions, when executed, determine if the browser extension is present and/or operational. In such an example, the monitoring instructions may continue to execute when the browser extension is not present and/or is not operational and/or may cease execution when the browser extension is present and/or is operational. Similarly, the monitoring instructions may detect whether the instrumented media was delivered via an encrypted communication (e.g., using HTTPS) and may cease execution when the page was not delivered via an encrypted communication (e.g., because the panelist meter 155 may meter the unencrypted media).

While the web browser 135 is described herein, any other type of application may be utilized. For example, a media player that can execute monitoring instructions in instrumented media could be utilized instead of the web browser 135.

The example media device data store 150 of the illustrated example of FIG. 1 may be any device for storing data such as, for example, flash memory, magnetic media, optical media, etc. In the illustrated example, the media device data store 150 is random access memory of the media device 130. Furthermore, the data stored in the media device data store 150 may be in any data format such as, for example, binary data, comma delimited data, tab delimited data, structured query language (SQL) structures, etc. While in the illustrated example the media device data store 150 is illustrated as a single database, the media device data store 150 may be implemented by multiple databases (e.g., distributed in two or more devices), and/or be stored in multiple memory locations of the media device.

The example panelist meter 155 of the illustrated example of FIG. 1 is implemented by a processor executing instructions, but it could alternatively be implemented by an ASIC, DSP, FPGA, or other circuitry (e.g., a dedicated circuit). For example, the panelist meter 155 may be a component built into the media device 130. In the illustrated example, the panelist meter 155 is downloaded to the media device 130. The example panelist meter 155 of FIG. 1 requests permission of a user to enable monitoring. Furthermore, the example panelist meter 155 collects demographic information from the user (e.g., by presenting a survey to the user). When consent for metering has been given, the example panelist meter 155 meters use of the mobile device 130. For example, the panelist meter 155 may monitor user inputs to the mobile device 130, may monitor media requested and/or received by the mobile device 130, and/or may monitor the presentation of media (e.g., audio, video, webpages, etc.) at the mobile device 130, may monitor the location of the mobile device 130. The example panelist meter 155 stores collected monitoring information in the example media device data store 150. The example panelist meter 155 periodically and/or aperiodically transmits collected metering data to the central facility 170 via example message 119.

In addition to performing monitoring, the example panelist meter 155 serves identifying information to the monitoring instructions included in instrumented media loaded by the web browser 135. According to the illustrated example, the identifying information provided to the instrumented media is the panelist identifier received from the central facility 170. Additionally or alternatively, any other identifying information or other type(s) of information may be provided by the panelist meter 155. For example, the panelist meter 155 may provide a fingerprint of the mobile device 130, a serial number of the mobile device 130, a panelist username, monitoring information collected by the panelist meter 155, etc. Additionally or alternatively, the panelist meter 155 may collect and store information sent to the panelist meter 155 by the instrumented media. For example, when the instrumented media is transmitted via encrypted communication that cannot be directly metered by the panelist meter 155, the instrumented media may transmit information selected by the media provider 110 to the panelist meter 155 that stores the information in the example data store 150. In such an example, the panelist meter 155 may transmit information from the instrumented media to the central facility via the example message 119.

In the example of FIG. 1, an SDK kit is provided from the central facility 170 of, for example, an audience measurement entity to the media provider 110 (e.g., to an application developer of the media provider 110). The provision of this SDK can be via an electronic communication 111 over the network 120. The media provider 110 employs the SDK to instrument media. The media provider 110 then serves the instrumented media in response to requests (e.g., requests from the media device 130). For example, instrumenting media to include monitoring instructions is described in U.S. Pat. No. 6,108,637 to Blumenau, which is hereby incorporated by reference in its entirety.

Once the instrumented media is made available by the media provider 110, members of the general public, some of which are panelists of the audience measurement entity, may request the media and download the instrumented media to their respective media device(s) 130 via an electronic message 115 as shown in FIG. 1. The electronic message 115 may be encrypted by the media provider 110 and decrypted by the web browser 135 on the media device 130 using HTTPS.

In a separate transaction, which may be totally unrelated to the downloading of the instrumented media, the central facility 170 may cause the panelist meter 155 to be downloaded to the mobile device 130. The panelist meter 155 may be an application that is downloaded via an electronic message 116 from the central facility as shown in FIG. 1 and/or may be downloaded from the media provider 110 (e.g., along the same and/or a similar path as the electronic message 115). When executed, the panelist meter 155 asks the panelist to consent to monitoring by the panelist meter 155. If the panelist agrees, the panelist meter 155 records the consent and collects demographic information from the user (e.g., one or more of gender, age, income level, information about the household, address, a username and/or other identifier etc.). The panelist meter 155 uploads the demographic information to the central facility 170 where it is stored in association with a panelist identifier generated for the media device 130 and/or the user of the media device 130. The panelist identifier is then transmitted to the panelist meter 155 where it is stored for subsequent use.

When the web browser 135 accesses the instrumented media, monitoring instructions in the instrumented media are executed to send a web request to the panelist meter 155 to perform a security handshake and request the panelist identifier assigned to the panelist meter 155 by the example central facility 170 and/or to transmit information for monitoring to the panelist meter 155. The metering instructions in the instrumented media then cause the web browser 135 to transmit media identifying information and the panelist identifier to the central facility 170 via, for example, a dummy request 117. The collection and reporting of information by the instrumented media may be triggered by an event (e.g., a user selecting a checkout option on a webpage). In some examples, reporting of the information may be restricted if the user has not consented to collection by the panelist meter 155 and/or the panelist meter 155 is not present (e.g., the panelist meter 155 has not been installed on the media device 130). Alternatively, the information may be reported without a panelist identifier when consent has not been received or the panelist meter 155 is not present.

The central facility 170 of the illustrated example is a facility of an audience measurement entity (e.g., the Nielsen Company (US) LLC) and includes an interface to receive the dummy request 117 reporting metering information (e.g., metadata) from the media device 130 via the network 120. The example central facility 170 of the illustrated example of FIG. 1 includes an HTTP interface 175, a registration data receiver 177, a data store 176, a monitoring data receiver 179, a software development kit (SDK) provider, and a reporter 182.

In the illustrated example, the central facility 170 includes an HTTP interface 175 to receive HTTP and HTTPS requests that include media monitoring information, demographic information, etc. The HTTP and/or HTTPS requests are sent with the media monitoring information in their payload (e.g., in the dummy request 117). The media monitoring information may include media-identifying information (e.g., media-identifying metadata, codes, signatures, watermarks, and/or other information that may be used to identify presented media) and/or user-identifying information (e.g., demographic information, a panelist identifier, a username, etc.), etc. The HTTP and/or HTTPS requests may not be intended to actually retrieve content, but are instead used as a vehicle to convey the metering information. Thus, the HTTP and/or HTTPS requests may be referred to as "dummy requests". The central facility 170 is provided with software (e.g., a daemon) to extract the metering information from the payload of the dummy request(s). Additionally or alternatively, any other method(s) to transfer the metering information may be used such as, for example a file transfer protocol (FTP), a secure file transfer protocol (SFTP), an HTTP and/or HTTPS GET request, an HTTP and/or HTTPS POST request, etc. The HTTP interface 175 of the illustrated example additionally transmits the panelist meter 155 to the media device 130 via message 117.

The example data store 176 of the illustrated example of FIG. 1 may be any device for storing data such as, for example, flash memory, magnetic media, optical media, etc. The data store 176 of the illustrated example of FIG. 1 stores monitoring information received at the registration data receiver (e.g., demographic information transmitted by the panelist meter 155), and/or received at the monitoring data receiver 179 (e.g., media-identifying information, application usage information, etc.). However, the data store 176 may additionally or alternatively store any other information. For example, the data store 176 may store information (e.g., identifying information for the media or any other information inserted into the instrumented media by the media provider 110) sent to the panelist meter 155 by the monitoring instructions in the instrumented media. Furthermore, the data stored in the data store 176 may be in any data format such as, for example, binary data, comma delimited data, tab delimited data, structured query language (SQL) structures, etc. While in the illustrated example the data store 176 is illustrated as a single database, the data store 176 may be implemented by multiple databases, and/or be stored in multiple memory locations of the media device.

The example registration data receiver 177 of the illustrated example of FIG. 1 is implemented by a logic circuit such as a processor executing instructions, but it could additionally or alternatively be implemented by an application specific integrated circuit(s) (ASIC(s)), programmable logic device(s) (PLD(s)) and/or field programmable logic device(s) (FPLD(s)), an analog circuit, and/or other circuitry. The example registration data receiver 177 receives demographic information from the panelist meters 155 on multiple different media devices (e.g., including the media device 130). The received registration and/or demographic information are stored in the data store 176. In some examples, the registration data receiver 177 generates panelist identifiers to be used to identify corresponding panelists. The panelist identifiers are stored in the data store 176 and at the corresponding media device 130. The panelist identifiers may later be used to correlate media exposure and/or application usage to a particular panelist and/or demographic. In some examples, the panelist identifier is transmitted to the panelist meter 155 associated with the corresponding panelist as an acknowledgement of received demographic information. Alternatively, the panelist identifier may be conveyed to the panelist meter 155 in any manner such as, for example, instructions instructing a user to input the panelist identifier, hard coding in the panelist meter 155 prior to installation of the panelist meter 155, installation in the panelist meter 155 by a technician of an audience measurement entity, a cookie including the panelist identifier, a file containing the panelist identifier, a panelist identifier generated by the panelist meter 155 or other components of the media device 130, etc.

The example monitoring data receiver 179 of the illustrated example of FIG. 1 is implemented by a logic circuit such as a processor executing instructions, but it could additionally or alternatively be implemented by an ASIC, a PLD, an FPLD, an analog circuit, and/or other circuitry. The example monitoring data receiver 179 receives media monitoring information originating from the metering instructions in the instrumented media (e.g., via the HTTP interface 175) and/or from the panelist meter 155. As disclosed herein, media monitoring information may include media-identifying information (e.g., media-identifying metadata, codes, signatures, watermarks, and/or other information that may be used to identify presented media), application usage information (e.g., an identifier of an application, a time and/or duration of use of the application, a rating of the application, etc.), user-identifying information (e.g., demographic information, a panelist identifier, a username, etc.), etc. The monitoring data receiver 179 stores the received monitoring information in the data store 176.

In the illustrated example, the example monitoring data receiver 179 stores and analyzes the monitoring information received from many different media devices. For example, the example monitoring data receiver 179 may sort and/or group metering information by media provider (e.g., by grouping all metering data associated different media providers into different respective groups, by grouping metering data associated with particular instrumented media into different respective groups, and/or by grouping metering data associated with different panelist meters into different respective groups). Any other processing of media monitoring information may additionally or alternatively be performed. In some examples, the monitoring data receiver 179 adds a timestamp to the media monitoring information upon receipt. Timestamping (e.g., recording a time that an event occurred) enables accurate identification and/or correlation of media that was presented and/or the time that it was presented with the demographics of the user(s) of the media device(s).

The example SDK provider 180 of the illustrated example of FIG. 1 is implemented by a logic circuit such as a processor executing instructions, but it could additionally or alternatively be implemented by an ASIC, a PLD, an FPLD, an analog circuit, and/or other circuitry. The example SDK provider 180 of this example provides instructions to media providers (e.g., the example media provider 110) to facilitate instrumentation of media provided. In some examples, the SDK is provided such that the media provider(s) can integrate the SDK into their respective existing media (e.g., after inserting identifying information for the media (and/or any other information to be tracked) into the media). While in the illustrated example an SDK is provided, the monitoring components instrumented by the SDK and/or monitoring instructions provided via the SDK may be provided in any other fashion. For example, the monitoring components may be provided as an application programming interface (API), a plugin, an add-on, etc. In some examples, the SDK may cause some monitoring instructions to be included in the media and some monitoring instructions to be made available for download from the media provider 110 by the media device 130 (e.g., the monitoring instructions included in the media may include a link to the monitoring instructions served by the media provider 110 or another entity such as the provider of the SDK (e.g., an AME)). Such an approach may enable the provider of the SDK and/or another entity to easily update or otherwise modify the monitoring instructions.

The example reporter 182 of the illustrated example of FIG. 1 is implemented by a logic circuit such as a processor executing instructions, but it could additionally or alternatively be implemented by an ASIC, a PLD, an FPLD, an analog circuit, and/or other circuitry. The reporter 182 of the illustrated example generates reports indicative of media exposure metrics. For example, the reporter 182 of this example compiles media exposure metrics based on the correlation of the media-identifying information and the user-identifying information. A report is then generated to indicate media exposure. In some examples, the exposure measurements provide ratings information for different media (e.g., a particular website, a particular video, etc.) In some examples, the exposure measurements indicate ratings information and/or usage statistics for different instrumented media.

Additionally or alternatively, popularities of different types of media across different device types may be reported. Such different types of media may be, for example, news, movies, television programming, on-demand media, Internet-based media, games, streaming games, advertisements, etc. Such comparisons may be made across any type(s) and/or number(s) of devices including, for example, cell phones, smart phones, dedicated portable multimedia playback devices, iPod® devices, tablet computing devices (e.g., an iPad®), standard-definition (SD) televisions, high-definition (HD) televisions, three-dimensional (3D) televisions, stationary computers, portable computers, Internet radios, etc. Any other type(s) and/or number(s) of media and/or devices may be analyzed. The report may also associate the media exposure metrics with demographic segments (e.g., age groups, genders, ethnicities, etc.) corresponding to the user(s) of the client device(s). Additionally or alternatively, the report may associate the media exposure metrics with metric indicators of the popularity of the artist, genre, song, title, etc., identified in the metering data across one or more user characteristics selected from one or more demographic segment(s), one or more age group(s), one or more gender(s), and/or any other user characteristic(s).

In some examples, the media exposure metrics are used to determine demographic details of online shoppers, demographic reach of streaming media, ratings for streaming media, engagement indices for streaming media, user affinities associated with streaming media, broadcast media, and/or any other audience measure metric associated with streaming media and/or locally stored media. While in the illustrated example, the media exposure metrics are used to provide information for webpage accesses, the media exposure metrics may be used to provide information for any other type of media such as, for example, streaming media, non-streaming media, etc.

Although for simplicity, the above discussion focuses on a single media device 130, a single media provider 110, and a single central facility 170, any number of any of these elements may be present. For example, in a typical implementation, it is expected that multiple media providers will offer instrumented media to the public at large. Thus, it is expected that there will be many instances of the above processes conducted across many devices at the overlapping and/or distinct times. Thus, for example, there may be many instantiations of the machine-readable instructions disclosed herein operating at the same or different time. Some of these instances may be implemented as parallel threads operating on a same device.

Figure 2:
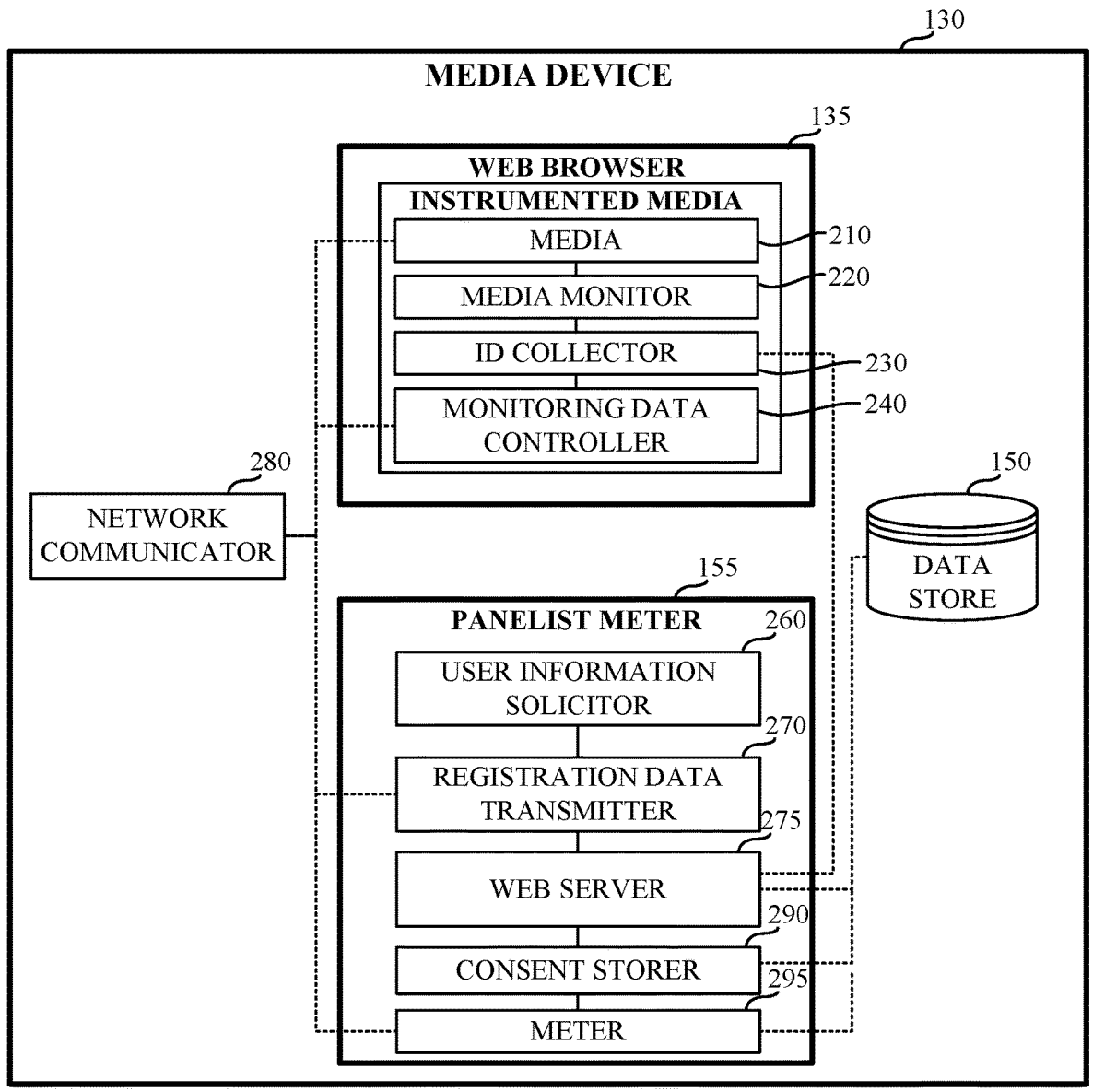
FIG. 2 is a block diagram of an example implementation of the example media device of FIG. 1.

FIG. 2 is a block diagram of an example implementation of the example media device 130 of FIG. 1. The example media device 130 of FIG. 2 includes the example web browser 135 the example media device data store 150, the example panelist meter 155, and a network communicator 280. The example web browser 135 of FIG. 2 processes the instrumented media 135. The example instrumented media of FIG. 2 includes media 210, a media monitor 220, an identifier (ID) collector 230, and a monitoring data controller 240. The example panelist meter 155 of FIG. 2 includes a user information solicitor 260, a registration data transmitter 270, a web server 275, a consent storer 290, and a meter 295.

The example media 210 of FIG. 2 is web page media including text, images, and/or audio. In the illustrated example, the web browser 135 loads the media and renders a display, images, audio, video, etc. Any other media presenting framework may additionally or alternatively be employed. For example, the media of the illustrated example may include and/or interact with an Adobe® Flash® media presentation framework.

The example media monitor 220 of the illustrated example of FIG. 2 is implemented by computer executable instructions. The media monitor 220 of FIG. 2 is downloaded with the instrumented media and is initiated when the instrumented media is processed by the example web browser 135. The media monitor 220 of the illustrated example extracts metering data from the instrumented media presented by the web browser 135. For example, the media monitor 220 can implement functionality provided by a software development kit (SDK) to extract one or more parameters recorded in the instrumented media. For example, an online store may include parameters indicating a client identifier of the online store issued by the audience measurement entity, a product name and/or identifier of the product, a product price, etc. The media monitor 220 may additionally or alternatively extract any other information such as, for example, watermarks from media, signatures of media, fingerprints of media, web browser information, uniform resource locators associated with the media, etc. The media monitor 220 may determine (e.g., extract, transform, derive, decode, convert, etc.) media-identifying metadata (e.g., such as media identifying information, source identifying information, a watermark, a code, etc.) associated with, and/or transmitted with the media (e.g., in an ID3 tag, in a Hypertext Transfer Protocol (HTTP) Live Streaming (HLS) manifest, in a Moving Pictures Experts Group version 2 (MPEG2) transport stream, in a timed text track, in an encryption key associated with the media, etc.). The media-identifying metadata may be a code in, for example, a text or binary format located in an ID3 tag associated with the media. In some examples, the media monitor 220 converts the metering data into a text and/or binary format for transmission to the central facility 170.

The example ID collector 230 of the illustrated example of FIG. 2 is implemented by computer executable instructions. The ID collector 230 of the illustrated example retrieves a panelist identifier from the panelist meter 155. According to the illustrated example, the ID collector 230 sends a web protocol request (e.g., a Web Socket request) to the panelist meter 155. The example ID collector 230 sends information proving the authenticity of the ID collector 230 and, more generally, the monitoring instructions of the instrumented media to the panelist meter 155. For example, the ID collector 230 may send a username and password, an encrypted key, a challenge phrase and/or may perform a handshake process. Once the example ID collector 230 is authenticated, the panelist meter 155 sends, and the ID authenticator receives the panelist identifier from the panelist meter 155 (e.g., the panelist identifier previously transmitted to the panelist meter 155 by the central facility 170). Additionally or alternatively, the ID collector 230 may transmit information to the panelist meter 155 (e.g., in a WebSocket request) for the panelist meter 155 to store and/or transmit the information to the central facility 170.

While a single panelist identifier is discussed herein, a household, media device, and/or any other unit may be associated with multiple panelist identifiers. For example, the panelist meter 155 may register multiple persons at a household and may obtain a separate panelist identifier for each person from the central facility 170. In such an example, during use of the media device 130, the panelist meter 155 may determine which user is using the media device 130 and may serve the appropriate panelist identifier.

The example monitoring data controller 240 of the illustrated example of FIG. 2 is implemented by computer executable instructions. In the illustrated example, the monitoring data controller 240 manages information collected by the monitoring instructions of the instrumented media (e.g., monitoring information and/or panelist identifiers). The example monitoring data controller 240 also controls transmission of the collected information to the central facility 170 of FIG. 1 via the network communicator 280. According to the illustrated example, the monitoring data controller 240 transmits the collected information to the central facility 170 using the dummy HTTP request 117.

Turning to the components of the panelist meter 155, the example user information solicitor 260 of the illustrated example of FIG. 2 is implemented by machine-readable instructions, but could additionally or alternatively be implemented by a dedicated logic circuit, an ASIC, a DSP, an FPGA, and/or other analog and/or digital circuitry. When the example panelist meter 155 is installed, the user information solicitor 260 opens a user interface asking the user to enable monitoring of their media and/or device usage. If the user declines, the user information solicitor 260 closes. In some examples, the user information solicitor 260 opens again to request the user to join the panel after a period of time. In other examples, the user information solicitor 260 may never ask again. If the user accepts, the user information solicitor 260 of the illustrated example solicits the user's demographics and/or other information. This information is requested once and, in some examples, enables monitoring across all apps having metering functionality. In the illustrated example, registration data (e.g., demographic information) is obtained from the user when the user joins (i.e., registers for) the panel. In the illustrated example, the registration data is received from a user via a user interface of the media device (e.g., a display, a touchscreen, a keyboard, etc.). Additionally or alternatively, the demographic information may be obtained from the user at any other time and/or in any other way (e.g., via a telephone interview, by having the user complete an online survey, etc.). U.S. patent application Ser. No. 13/828,971, entitled "SYSTEMS AND METHODS FOR IDENTIFYING A USER OF AN ELECTRONIC DEVICE," discloses methods and apparatus to obtain user consent for monitoring and collect monitoring information and is incorporated by reference herein in its entirety.

Panelists may be contacted and/or enlisted using any desired methodology (e.g., random selection, statistical selection, phone solicitations, Internet advertisements, surveys, advertisements in shopping malls, product packaging, etc.).

The example registration data transmitter 270 of the illustrated example of FIG. 2 is implemented by computer executable instructions, but could additionally or alternatively be implemented by a dedicated logic circuit, ASIC, DSP, FPGA, and/or other analog and/or digital circuitry. In the illustrated example, the registration data transmitter 270 transmits registration data received via the user information solicitor 260 to the central facility 170 via the network communicator 280. In the illustrated example, when a user joins the panel, the registration data transmitter 270 contacts the central facility 170 to request a panelist identifier. However, in some examples, rather than asking the central facility 170 for the panelist identifier, the registration data transmitter 270 and/or the user information solicitor 260 generates a panelist identifier. In some examples the panelist identifier is generated based on the registration data (e.g., demographic data and/or other panelist information). For example, the panelist identifier may be a telephone number associated with the panelist, a hardware address of the media device (e.g., a media access control (MAC) address, a serial number, etc.), etc. In some examples, the panelist identifier is not based on the registration data and is, instead, a random and/or pseudo-random identifier. In some examples, the registration data transmitter 270 encrypts the panelist identifier prior to storing the identifier (or an encrypted form of the identifier). Encrypting the panelist identifier ensures that sensitive panelist information is not exposed to applications that would otherwise attempt to gain access to sensitive panelist information. Accordingly, instrumented media does not have access to panelist information other than the panelist identifier which, while identifying the panelist, does not identify any sensitive information about the panelist (e.g., a telephone number, an email address, a mailing address, a social security number, a credit card number, etc.). The example registration data transmitter 270 provides the panelist identifier to the web server 275.

The example web server 275 of the illustrated example of FIG. 2 is implemented by computer executable instructions, but could additionally or alternatively be implemented by a dedicated logic circuit, ASIC, DSP, FPGA, and/or other analog and/or digital circuitry. The example web server 275 securely serves the panelist identifier to the monitoring instructions of instrumented media via a web protocol so that the information reported by the monitoring instructions can be linked to the panelist. In other words, monitoring information collected at the media device 130 by instrumented media from multiple media providers can be linked to the same panelist by way of the panelist identifier provided to the instrumented media by the web server 275.

The example web server 275 utilizes a web sockets protocol serving the panelist identifier and/or collecting information monitoring instructions in instrumented media via the local network of the media device 130 using a network socket. For example, the web server 275 may serve the panelist identifier and/or collect information using a port that is predetermined so that the monitoring instructions of the instrumented media know the port for sending the request for the panelist identifier.

When the example web server 275 of FIG. 2 receives a request, the web server 275 responds with a request for authentication information. For example, the example web server 275 of this example may not communicate with monitoring instructions until a valid password, challenge phrase, certificate, etc. is received. To provide further security for the panelist identifier, the example web server 275 hashes, encrypts, or otherwise protects a combination of the panelist identifier, a computer identifier (e.g., an identifier established for the particular media device 130 during installation of the panelist meter 155), and a salt. The example web server 275 serves the hashed value to the instrumented media and the hash is recorded by the central facility 170 at a later time.

In some instances, the central facility 170 does not need to retrieve the identifying information from the hash and hash value is stored, which hash value distinctly identifies the combination of panelist and computer. Alternatively, the central facility 170 could compute hash values from stored panelist identifiers and computer identifiers (e.g., values that are known to the central facility 170 during the panelist registration) and may compare the computed hash values with hash values received in metering data to determine the actual panelist identifier and computer identifier (e.g., when a hash computed at the central facility using a panelist identifier and computer identifier matches a hash value received in metering data from a media device). In another example, the panelist meter 155 may compute the hash value during the panelist registration and the central facility 170 may store the hash value in association with the computer identifier and panelist identifier so that hash values received in metering data can be compared against the stored hash values at the central facility 170. Alternatively, the panelist identifier and/or other information may be served by the web server 275 in the clear and/or using any other type of obfuscation to prevent interception (e.g., encryption) during handling of the panelist identifier or other information. The information served by the web server 275 may include additional parameters such as a user identifier, metering information collected by the panelist meter 155, etc.

The example consent storer 290 of the illustrated example of FIG. 2 is implemented by computer executable instructions, but could additionally or alternatively be implemented by a dedicated logic circuit, ASIC, DSP, FPGA, and/or other analog and/or digital circuitry. In the illustrated example, the consent storer 290 stores a consent identifier in the media device data store 150. In the illustrated example, the consent identifier is a binary indicator separate from the panelist identifier that indicates whether monitoring is enabled. For example, the consent storer 290 stores an indication that monitoring is not enabled when the user has not consented to monitoring and stores an indication that monitoring is enabled when the user has consented.

The example meter 295 of the illustrated example of FIG. 2 is implemented by computer executable instructions, but could additionally or alternatively be implemented by a dedicated logic circuit, ASIC, DSP, FPGA, and/or other analog and/or digital circuitry. The meter 295 of the illustrated example monitors the media device 130 separately from the metering by the instrumented media. For example, the meter 295 may monitor user input to the media device 130, may monitor data received by and/or transmitted by the media device 130, may extract identifying information (e.g., codes, watermarks, signatures, metadata, etc.) from media presented by the metering device, etc. The example meter 295 stores metering information in the media device data store 150 and periodically transmits collected metering information (e.g., including information collected from the monitoring instructions in the instrumented media) to the central facility 170.

The example network communicator 280 of the illustrated example of FIG. 2 is an Ethernet interface. In the illustrated example, the network communicator 280 transmits the media to the web browser 135, transmits monitoring information from the monitoring data collector 240 to the central facility 170, transmits registration data from the registration data transmitter 270 to the central facility 170, and transmits metering information collected by the meter 295 to the central facility 170. The data is transmitted to the central facility 170 using one or more HTTP requests or other web protocol requests. For example, the HTTP request may be a dummy request in that it is not intended to receive data, but rather is used as a vehicle to carry monitoring data (e.g., panelist demographic information, app usage information, media identifying information, etc.) to the central facility 170. However, any other way of transmitting data may additionally or alternatively be used such as, for example, a file transfer protocol (FTP), etc.

Significantly, the panelist meter 155 of FIG. 2 enables unique identifying information (e.g., a panelist identifier, a computer identifier, etc.) to be provided to instrumented media so that monitoring information transmitted to the central facility 170 by the instrumented media can be associated with the panelist, the media device 130, etc. By uniquely identifying the metering information of the instrumented media, media that cannot be metered by the panelist meter 155 can be metered. For example, HTTPS traffic is difficult to meter because the panelist meter 155 cannot access the payload of the HTTPS traffic without the use of a browser extension. The system disclosed herein is capable of metering HTTPS traffic even when a browser extension is not available (e.g., when a browser that does not have a browser extension is used, when a browser extension is broken (e.g., due to a browser update), when a user uninstalls a browser extension, etc.). Furthermore, the system may facilitate a reduction in computing resource usage by eliminating the need to install and maintain a browser extension.

While example manners of implementing the example central facility 170 is illustrated in FIG. 1 and the example media device 130 of FIG. 1 is illustrated in FIG. 2, one or more of the elements, processes and/or devices illustrated in FIGS. 1 and/or 2 may be combined, divided, re-arranged, omitted, eliminated and/or implemented in any other way. Further, the example HTTP interface 175, the example registration data receiver 177, the example monitoring data receiver 179, the example SDK provider 180, the example reporter 182 and/or, more generally, the example central facility 170 of FIG. 1, the example media monitor 220, the example ID collector 230, the example monitoring data collector 240, the example user information solicitor 260, the example registration data transmitter 270, the example web server 275, the example consent storer 290, the example meter and/or, more generally, the example meter 130 of FIG. 2 may be implemented by hardware, software, firmware and/or any combination of hardware, software and/or firmware. Thus, for example, any of the example HTTP interface 175, the example registration data receiver 177, the example monitoring data receiver 179, the example SDK provider 180, the example reporter 182 and/or, more generally, the example central facility 170 of FIG. 1, the example media monitor 220, the example ID collector 230, the example monitoring data collector 240, the example user information solicitor 260, the example registration data transmitter 270, the example web server 275, the example consent storer 290, the example meter and/or, more generally, the example meter 130 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example HTTP interface 175, the example registration data receiver 177, the example monitoring data receiver 179, the example SDK provider 180, the example reporter 182 and/or, more generally, the example central facility 170 of FIG. 1, the example media monitor 220, the example ID collector 230, the example monitoring data collector 240, the example user information solicitor 260, the example registration data transmitter 270, the example web server 275, the example consent storer 290, the example meter and/or, more generally, the example meter 130 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example central facility 170 of FIG. 1 and/or the example media device 130 of FIG. 2 may include one or more elements, processes and/or devices in addition to, or instead of, those illustrated in FIGS. 1 and/or 2 and/or may include more than one of any or all of the illustrated elements, processes and devices.

Figure 3:
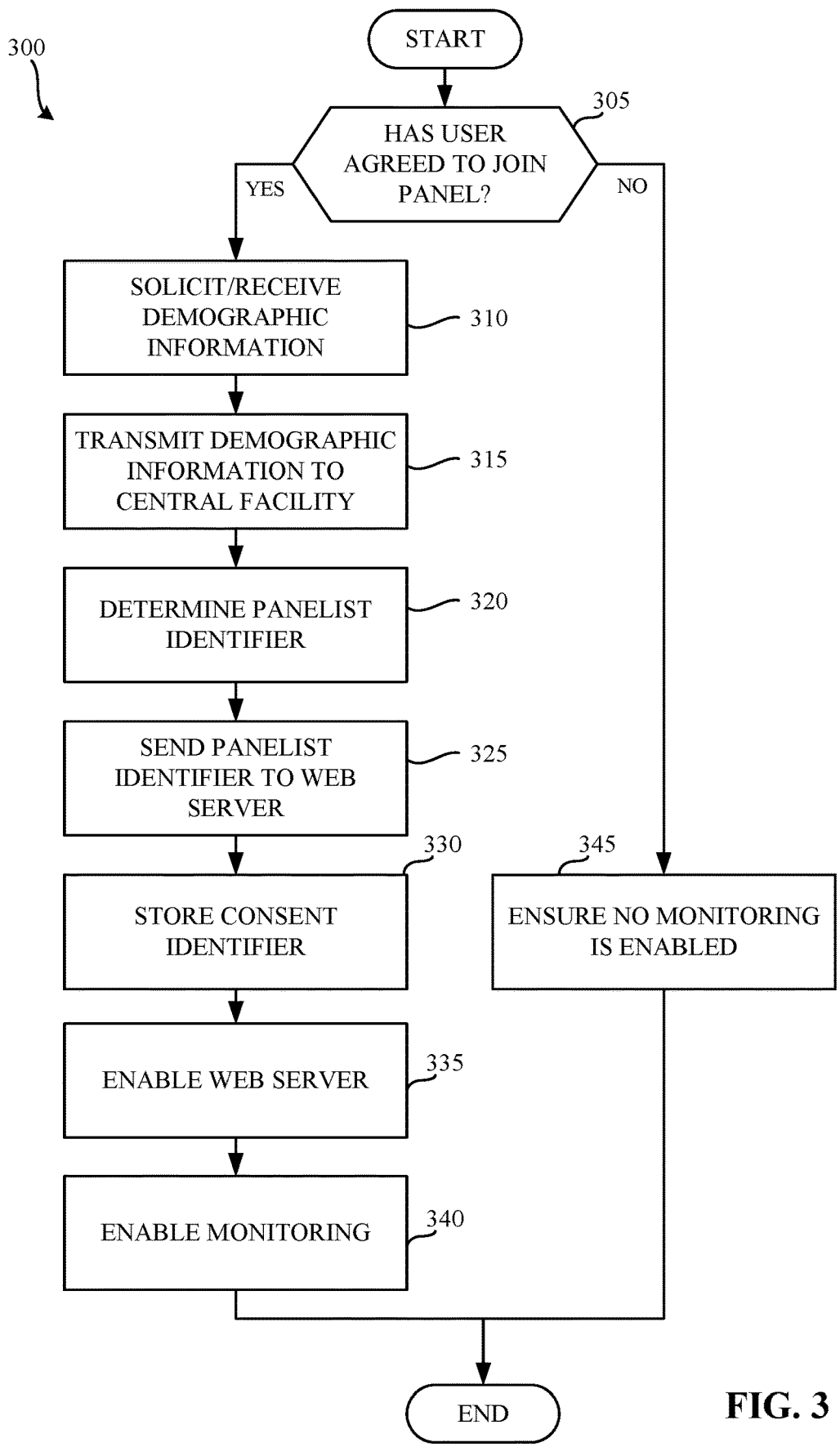
FIG. 3 is a flowchart representative of example machine-readable instructions that may be executed to implement the example panelist meter of FIGS. 1 and/or 2.
Figure 4:
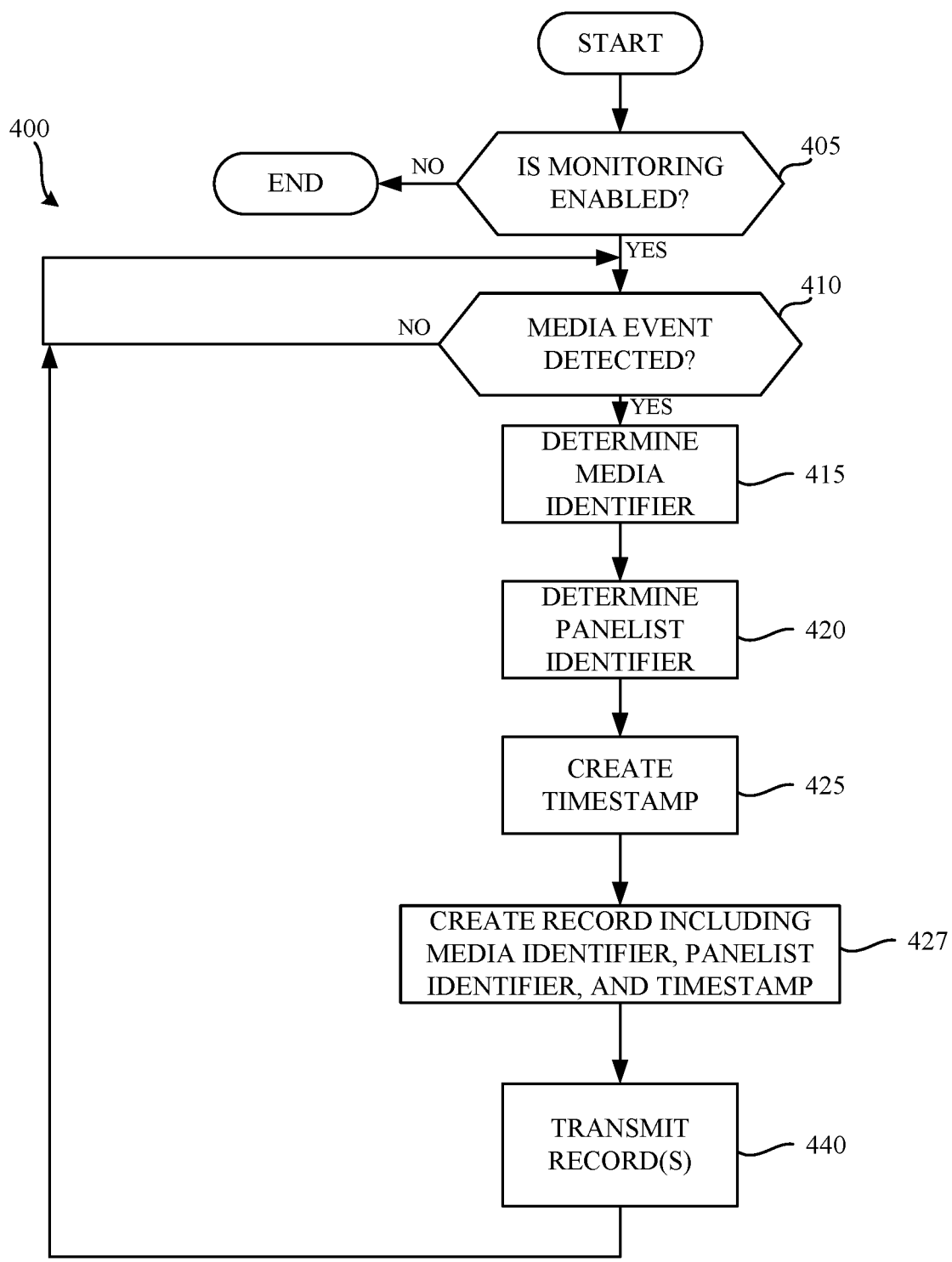
FIG. 4 is a flowchart representative of example machine-readable instructions that may be executed to implement the example instrumented media of FIGS. 1 and/or 2.
Figure 5:
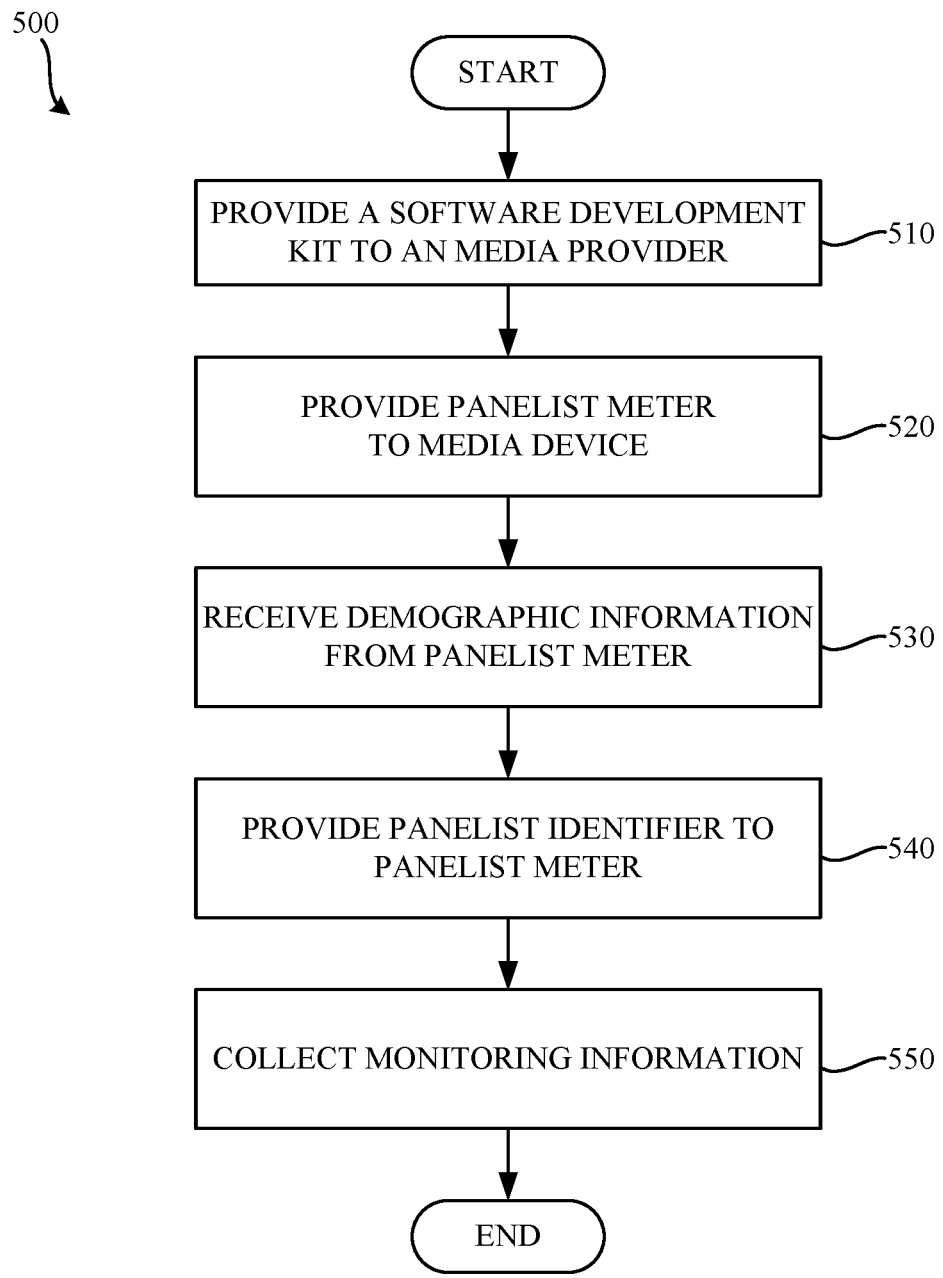
FIG. 5 is a flowchart representative of example machine-readable instructions that may be executed to implement the central facility of FIG. 1.

Flowcharts representative of example machine readable instructions for implementing the example panelist meter 155 of FIGS. 1 and/or 2, the example instrumented media of FIGS. 1 and 2, and/or the example central facility 170 of FIG. 1 are shown in FIGS. 3-5. In these examples, the machine readable instructions comprise program(s) for execution by a processor such as the processor 612 shown in the example processor platform 600 discussed below in connection with FIG. 6 and the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program(s) are described with reference to the flowcharts illustrated in FIGS. 3-5, many other methods of implementing the example panelist meter 155, the example instrumented media, and/or the example central facility may alternatively be used. For example, the order of execution of the blocks may be changed, and/or some of the blocks described may be changed, eliminated, or combined.

As mentioned above, the example processes of FIGS. 3-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flowchart representative of example machine-readable instructions that may be executed to implement the example panelist meter 155 of FIGS. 1 and/or 2. The example program 300 of FIG. 3 begins when the example panelist meter 155 is installed. In the illustrated example, the panelist meter 155 is installed when the media device 130 downloads and installs the panelist meter 155 from the central facility 170 (e.g., after prompting or advertising by the audience measurement entity that runs the central facility 170). However, the panelist meter 155 may be installed in any other fashion. Additionally or alternatively, the example program 300 of FIG. 3 may begin when a user executes the panelist meter 155. In some examples, the user executes the panelist meter 155 by clicking on an icon of the panelist meter 155. Additionally or alternatively, the panelist meter 155 may be installed at or prior to the point of sale of the media device 130. For example, the consumer may be given a financial incentive to enable monitoring as disclosed, for example, in U.S. Provisional patent application Ser. No. 61/774,461, which is hereby incorporated by reference.

The user information solicitor 260 of the illustrated example determines if the user has agreed to become a panelist at block 305. In some examples, the user information solicitor 260 determines if the user has agreed to become a panelist by prompting the user to become a panelist. For example, a prompt may be displayed asking the user "Would you allow us to monitor your media exposure and/or media device usage?" However, in some examples the user may have already indicated that they wish to become a panelist by, for example, agreeing to install the panelist meter 155. If the user has agreed to join the panel (e.g., become a panelist) (block 305), the user information solicitor 260 solicits the panelist for user identification and/or demographic data (block 310). In the illustrated example, the user information solicitor 260 collects the demographic information entered by the panelist (block 310). In the illustrated example, demographic information may include for example, an ethnicity, an income level, an address, interests of the panelist, and/or on the any other demographic information related to the panelist.

The example registration data transmitter 270 transmits the collected demographic information to the central facility 170 (block 315). In the illustrated example, the demographic information is transmitted by the registration data transmitter 270 via the network communicator 280. In the illustrated example, the demographic information is transmitted immediately upon collecting the demographic data from the panelist via the user information solicitor 260. However the data may be transmitted in any other fashion. For example, the data may be stored in the media device data store 150 and transmitted to the central facility 170 at a later time.

The registration data transmitter 270 then determines a panelist identifier (block 320). In the illustrated example, the panelist identifier is determined by requesting the panelist identifier from the central facility 170 (e.g., from the example registration data receiver 177 of the central facility 170). However, the panelist identifier may be determined in any other fashion such as, for example, by deriving the panelist identifier based on a social security number of the panelist, based on a phone number of the panelist, based on a hardware address of the media device (e.g. a media access control (MAC) address of the media device), etc. The registration data transmitter 270 then provides the panelist identifier to the web server 275 for serving to instrumented media (block 325). In the illustrated example, the registration data transmitter 270 hashes the panelist identifier with a computer identifier and a salt before providing the hash value to the web server 275. Additionally or alternatively, the panelist identifier may be encrypted. Encrypting the panelist identifier ensures that the identifier remains anonymous. For example, if a social security number of the panelist was used as the panelist identifier, the panelist identifier would include sensitive panelist information that should not be shared with other applications. However, if the sensitive panelist information (e.g., the social security number) is encrypted, the sensitive information contained therein is not identifiable by applications or third parties that might gain access to the panelist identifier (e.g., by intercepting network packets transmitted from the monitoring data controller 240).

In the illustrated example, the consent storer 290 stores a consent identifier in the media device data store 150 (block 330). In the illustrated example, the consent identifier is a binary indicator separate from the panelist identifier that indicates whether monitoring is enabled. However, in some examples, a consent indicator separate from the panelist identifier may not be stored. In such an example, the panelist identifier itself may serve as an indication as to whether monitoring is enabled. In some examples, the consent storer 290 and block 330 may be eliminated (e.g., where installation of the panelist meter 155 itself signals that consent has been provided).

The example web server 275 then enables web serving functionality (e.g., by listening for requests and responding to received requests) (block 335). According to the illustrated example, the web server 275 begins listening for Web Socket requests issued to a preselected port (e.g., Web Socket requests transmitted by the monitoring instructions of the instrumented media that is accessed by the web browser 135). When such a request is received, the example web server 275 confirms the authenticity of the request (e.g., by performing a handshake that is kept private by the audience measurement entity) and transmits the panelist identifier to authenticated requestors.

The example panelist meter 155 also enables metering by the meter 295. For example, the meter 295 may begin monitoring the operation of the mobile device 130 and recording monitoring information to the media device data store 150. Such metering may be include collecting signatures, collecting fingerprints, collecting codes, collecting watermarks, tracking user inputs, tracking network communications, tracking location, tracking handling of the media device, etc. Techniques for metering media devices using a meter are well-known and, thus, not described in further detail herein.

Referring back to block 305, if the user has not agreed to join the panel (block 305), the consent storer 290 ensures that the consent identifier and/or the panelist identifier is not stored in the media device data store 150. The absence of such an indicator serves as a message to instrumented media that monitoring is disallowed. In some examples, the consent storer 290 deletes the panelist identifier and/or the consent identifier. However in some examples, the consent storer 290 only deletes the consent identifier that enables monitoring. That is, the consent storer 290 may leave the panelist identifier in the media device data store 150. By leaving the panelist identifier in the media device data store 150, the same panelist identifier is used if the panelist later decides to rejoin the panel. In such examples, the panelist identifier may not serve as the consent identifier. After ensuring that no indicators enabling monitoring are stored (block 335), the process terminates. However, the process may be restarted anytime by executing the panelist meter 155 on the media device 130.

FIG. 4 is a flowchart representative of example machine-readable instructions that may be executed to implement monitoring instructions included in instrumented media (e.g., monitoring instructions added using an SDK provided by the example SDK provider 180). The example program 400 of FIG. 4 begins when the example instrumented media is received by the web browser 135 of the example media device 130. In some examples, the example program 400 of FIG. 4 begins when the example web browser 135 is executed. The example web browser 135 may be executed when, for example, a user clicks on an icon associated with the web browser 135.

The example media monitor 220 of the example web browser 135 initializes the monitoring instructions to determine if monitoring is enabled (block 405). In the illustrated example, the media monitor 220 determines whether monitoring is enabled by sending a request to the web server 275 of the example panelist meter 155. In the illustrated example, initializing the monitoring instructions also includes initializing an empty parameter store and adding a client identifier value assigned to the media provider 110 that served the instrumented media.

If monitoring is not enabled (block 405), the process 400 terminates, as the user has not given their consent to be monitored. Alternatively, execution of the monitoring instructions of the instrumented media may proceed but a panelist identifier may not be included in the reported monitoring data.

If monitoring is enabled (block 405), the media monitor 220 waits until a media event is detected. Media events may be triggered when, for example, a user input is selected in the example media 210 (e.g., when a checkout button is clicked), when the web browser 135 begins playing a video included in or referenced by the media 210, when the web browser 135 displays an image (e.g., an advertisement) included in or referenced by the media 210, the example web browser 135 is restarted, etc. Additionally or alternatively, metering may be triggered by the loading of the media 210 in the web browser 135 (e.g., without any additional event occurring). If a media event is not detected (block 410), the media monitor 220 continues to wait for a media event.

While in the illustrated example monitoring does not occur unless permission and/or consent is given, in some examples, monitoring may occur regardless of whether permission and/or consent is given. In such cases, the collected monitoring information may not be transmitted to the central facility 170. That is, the monitoring instructions of the instrumented media may operate, but not transmit collected monitoring data unless consent is received. Once consent is received (e.g., by detection of a consent and/or panelist identifier), the monitoring data controller 240 may transmit the previously collected monitoring information to the central facility 170 (as well as future monitoring information). In other words, the consent identifier may be retroactive in that it authorizes previous monitoring activity.

If a media event is detected (block 410), the media monitor 220 determines a media identifier associated with media presented by the web browser 135 (block 415). In the illustrated example, the media monitor 220 includes instructions that add media-identifying information to the parameter store initialized by the media monitor 220. For example, where the metering is triggered by user selection of a checkout button at an online store that media monitor 220 may add a product identifier and a product price to the parameter store that has already been initialized with a client identifier. Alternatively, media-identifying information may be collected from any other source such as, for example, the media monitor 220 may query the panelist meter 155 for media-identifying information, the media monitor 220 may collect media-identifying information from a browser extension installed in the web browser 135, the media monitor 220 may extract metadata from the example media 210, etc. For example, the media monitor 220 may extract media-identifying metadata from an ID3 tag transmitted in association with the presented media (see, for example, U.S. patent application Ser. No. 13/341,646, U.S. patent application Ser. No. 13/341,661, U.S. patent application Ser. No. 13/443,596, U.S. patent application Ser. No. 13/455,961, U.S. patent application Ser. No. 13/341,646, and U.S. patent application Ser. No. 13/472,170). In some examples, the media monitor 220 determines the media identifier by extracting, decoding, etc. a code, a signature, and/or a watermark embedded in the presented media. Additionally or alternatively, other any other information selected by the media provider 110 and/or the audience measurement entity may be collected. For example, the media provider 110 and/or the audience measurement entity may add any desired parameters and/or information to the instructions of the instrumented media so that the parameters and/or information is included in the monitoring data collected by the instructions and transmitted to the central facility 170 and/or the panelist meter 155.

The ID collector 230 of the illustrated example retrieves the panelist identifier from the media device data store 150 (block 420). In the illustrated example, retrieving the panelist identifier includes initializing a web protocol socket (e.g., a WebSocket) with a uniform resource identifier identifying the web server 275 on a local network of the media device 130. The example ID collector 230 conducts a handshake with the example web server 275 to authenticate the ID collector 230 to the web server 275. The ID collector 230 then receives a response from the web server 275 that includes a hash value that includes the panelist identifier (e.g., a hash of the panelist identifier, a computer identifier, and a salt value). According to the illustrated example, the ID collector 230 stores the received panelist identifier (e.g., the hash value) in the parameter store that already includes, for example, the client identifier and media-identifying information. Additionally or alternatively, at block 420, the ID collector 230 may transmit information associated with the instrumented media to the web server 275 for storage in the example data store 150. For example, the ID collector 230 may transmit the parameters inserted in the instrumented media by the media provider 110.

According to the illustrated example, the media monitor 220 then creates a timestamp (block 425). Timestamping (e.g., recording a time that an event occurred) enables accurate identification and/or correlation of media that was presented and/or the time that it was presented with the user(s) using the media device 130 at that time. Usage of the media device 130 may be identified in any desired manner.

The monitoring data controller 240 of the illustrated example then creates a record including the contents of the parameter store (e.g., the client identifier, the media-identifying information, and the panelist identifier) and the timestamp (of block 425). In the illustrated example, the record is formatted as a comma separated value (CSV) record. However, any other type(s) and/or format(s) of record may additionally or alternatively be used. For example, the record may be formatted as an extensible markup language (XML) record.

The example monitoring data controller 240 then causes the network communicator 280 to transmit the record to the central facility 170 (block 440). According to the illustrated example, the record is transmitted as a dummy HTTP request to the HTTP interface 175. In some examples, records are stored in the media device data store 150 so that they may be transmitted in a single transmission (e.g., a single HTTP request, a single file transfer protocol (FTP) command, etc.).

Control then returns to block 410 to await a further media event and/or initialization of the monitoring instructions of the instrumented media.

The following pseudo code illustrates an example implementation of the monitoring instructions in the instrumented media:

Example Pseudocode for Monitoring
Instructions of Instrumented Media

```
'Initialize a dataStore with blank values for client identifier, media-
identifying information, and panelist identifier (uniqueID)
dataStore( )
   var clientID
   var product
   var price
   var uniqueID
end
'Set and Get methods for handling parameters in the dataStore
setClientID(val)
   clientID = val
end
setProduct(val)
   product = val
end
setPrice(val)
   Price = val
end
setUniqueID(val)
   UniqueID = val
end
```

-continued

Example Pseudocode for Monitoring
Instructions of Instrumented Media

```
getClientID( )
   return clientID
end
getProduct( )
   return product
end
getPrice( )
   return price
end
getUniqueID( )
   Return uniqueID
end
'Private Function for retrieving panelist identifier from the web server of
the panelist meter
getPrivateUniqueID( )
   Initialize new Websocket for ws://127.0.0.1:8512/uniqueID/
   Send handshake data via Websocket
   Receive uniqueID
   Call setUnqiueID with received uniqueID
End
'Public Function for reporting the collecting information stored in the
dataStore to the central facility
reportData( )
   Call getPrivateUniqueID to set uniqueID
   Transmit dataStore to collection facility
end
```

FIG. 5 is a flowchart representative of example machine-readable instructions that may be executed to implement the central facility 170 of FIG. 1. The example program 500 of FIG. 5 begins when the SDK provider 180 provides a software development kit (SDK) to the media provider 110 (block 510). The SDK enables the media provider 110 to create the instrumented media that is delivered to the web browser 135 of the media device 130. In the illustrated example, monitoring functionality is provided via an SDK. However, monitoring functionality may be provided via, for example, an API, a programming library, a dynamically linked library (DLL), a plug-in, an add-on, etc.

The example HTTP interface 175 provides the panelist meter 155 to the media device 130 (block 510). In the illustrated example, the panelist meter 155 is provided directly to the media device 130 via, for example, a website, a mailed compact disc, etc. In some examples, the panelist meter 155 is provided to a manufacturer and/or reseller of the media device 130. In examples where the panelist meter 155 is provided to the media device manufacturer, the media device manufacturer may design (e.g., develop, produce, manufacture, etc.) the media device 130 with the panelist meter 155 as an integrated component. In examples where the panelist meter 155 is provided to the reseller, the reseller may install (e.g., modify, alter, adapt, etc.) the panelist meter 155 at or prior to the time of sale of the media device 130 to the retailer and/or to the end user (e.g., the consumer).

The example registration data receiver 177 receives demographic information from the panelist meter 155 (block 530). In the illustrated example, the demographic information is received when the registration data transmitter 270 transmits the demographic information received from the user to the registration data receiver 177. In response to receiving the demographic information (block 530), the registration data receiver 177 generates a panelist identifier associated with the panelist. In some examples, the panelist identifier is generated based on the demographic information. The registration data receiver 177 provides the panelist identifier to the registration data transmitter 270 of the panelist meter 155 (block 540). The panelist identifier is then made available to instrumented media processed in the web browser 135 of the media device 130 by the web server 275.

The example monitoring data receiver 179 collects monitoring information transmitted to the central facility 170 by the media device 130 (e.g., from the instrumented media and/or from the panelist meter 155 (block 550). According to the illustrated example, the monitoring data controller 240 of the instrumented media transmits a client identifier associated with the media provider 110, media-identifying information, and a panelist identifier received from the panelist meter 155 to the example monitoring data receiver 179. Using the panelist identifier, the example monitoring data receiver 179, the reporter 182, and/or any other component of the central facility 170 can link the received record of media presentation (e.g., the media-identifying information and the client identifier) to the panelist identifier and, more particularly, to the demographic information received by the registration data receiver 177 at block 530.

Figure 6:
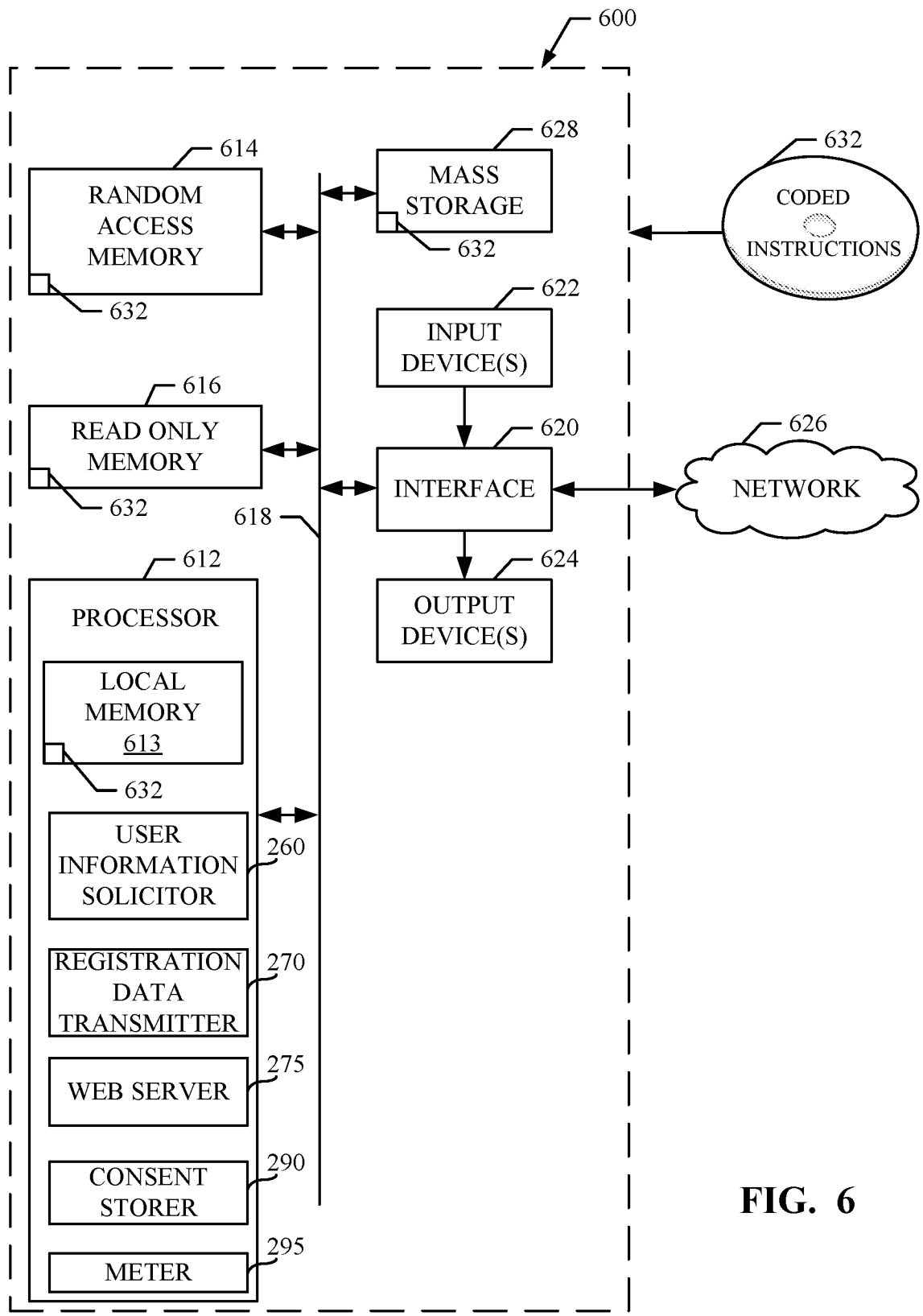
FIG. 6 is a block diagram of an example processor platform structured to execute the example machine-readable instructions of FIG. 3 to implement the example panelist meter of FIGS. 1 and/or 2.

FIG. 6 is a block diagram of an example processor platform 600 capable of executing the instructions of FIGS. 3-4 to implement the example media device 130 of FIGS. 1 and/or 2. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 includes the example user information solicitor 260, the example registration data transmitter 270, the example web server 275, the example consent storer 290, and the example meter 295 of FIG. 2. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 3-5 may be stored in the mass storage device 628, in the volatile memory 614, in the non-volatile memory 616, and/or on a removable tangible computer readable storage medium such as a CD or DVD.

Figure 7:
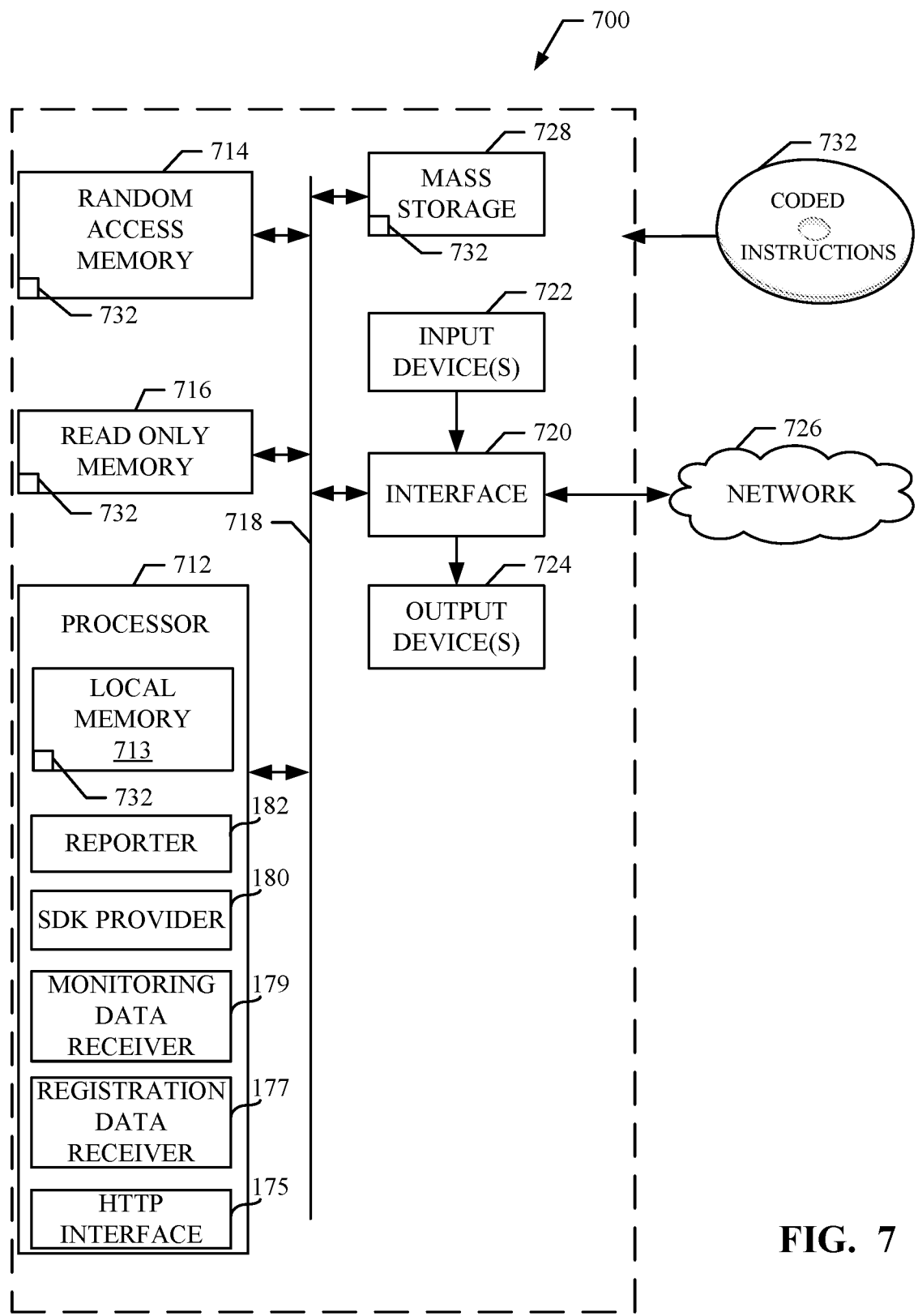
FIG. 7 is a block diagram of an example processor platform structured to execute the example machine readable instructions of FIG. 5 to implement the example central facility of FIG. 1.

FIG. 7 is a block diagram of an example processor platform 700 capable of executing the instructions of FIG. 5 to implement the example central facility 170 of FIG. 1. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The example processor 712 includes the example HTTP interface 175, the example registration data receiver 177, the example monitoring data receiver 179, the example SDK provider 180, and the example reporter 182 of FIG. 1. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 3-5 may be stored in the mass storage device 728, in the volatile memory 714, in the non-volatile memory 716, and/or on a removable tangible computer readable storage medium such as a CD or DVD.

Example systems disclosed herein enable monitoring of online media. In some examples, media that is encrypted (e.g., media communicated via HTTPS) may be monitored when a panelist meter is not able to access the media (e.g., when a browser extension is not available) and the encryption prevents a panelist meter from accessing the payload of encrypted media packets. This is accomplished by instrumenting the media with instructions that, when executed by a user's media device, communicate with a panelist meter or other software executing on the media device (e.g., communicate with a web server provided by the software). In some examples, the instructions may be populated with identifying information or any other information desired by the a media provider to be tracked by the panelist meter and/or transmitted to a central facility. Furthermore, use of computing resources may be reduced by eliminating browser extensions that are typically used for collecting information about encrypted online media. In particular, not loading an extension into memory when executing a browser will reduce the amount of memory and processing cycles consumed by such an extension. Furthermore, in some examples, the disclosed instrumented media causes monitoring instructions to be executed at the time that the instrumented media is processed and causes the monitoring data to be immediately transmitted to a central facility. Accordingly, computer resources (e.g., processing resources utilized by an extension) are not expended on attempting to detect media usage when media is not accessed. Furthermore, the use of storage space is reduced by the transmitting of the monitoring data as it is generated. In examples where instrumented media transmits information to the panelist meter for storage, media that could not previously be metered by a panelist meter (e.g., due to encryption of the media) can be metered and/or information selected by media providers can be collected by instrumenting the media to transmit the information to the panelist meter for storage and transmission to a central facility.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer readable storage medium having stored thereon computer readable instructions that, when executed by a processor, cause one or more machines to be configured to at least:

embed monitoring instructions into media to generate instrumented media; and provide the instrumented media to a media device via a hypertext transport secure protocol for presentation on the media device via a media browser application of the media device, wherein the embedded monitoring instructions, when executed by the media device, cause the media device to perform a set of operations, wherein the media device comprises a panelist meter that is unable to collect media-identifying information from the instrumented media when (i) the instrumented media is provided to the media device via the hypertext transport secure protocol and (ii) the media browser application does not include a browser extension configured to collect media-identifying information associated with encrypted media, wherein encryption of the media prevents the panelist meter from accessing a payload of packets of the encrypted media, the set of operations comprising:

determining whether the media browser application includes a browser extension configured to collect media-identifying information associated with encrypted media, and in response to the determination being that the media browser application does not include the browser extension configured to collect media-identifying information associated with encrypted media:

requesting a panelist identifier associated with the media device;

detecting a media event based on at least one of the media browser application initializing playout of a video corresponding to the instrumented media, the media device receiving user input corresponding to a selection in the instrumented media, or the media browser application displaying an image corresponding to the instrumented media;

in response to detecting the media event, collecting media-identifying information from the instrumented media;

generating a record including the media-identifying information and the panelist identifier; and transmitting the record to a remote computing system of an audience measurement entity, wherein transmitting the record to the remote computing system reduces the use of storage space on the media device.

2. The non-transitory computer readable storage medium of claim 1, wherein requesting the panelist identifier comprises requesting the panelist identifier from a web server using a web protocol request via a local network of the media device.

3. The non-transitory computer readable storage medium of claim 1, the set of operations further comprising adding a client identifier associated with the instrumented media to the record.

4. The non-transitory computer readable storage medium of claim 1, wherein the selection is a checkout on a webpage, the set of operations further comprising adding a product identifier and a product price associated with the checkout to the record.

5. A method of monitoring a media device, the method comprising:

embedding monitoring instructions into media to generate instrumented media; and providing the instrumented media to a media device via a hypertext transport secure protocol for presentation on the media device via a media browser application of the media device, wherein the embedded monitoring instructions, when executed by the media device, cause the media device to perform a set of operations, wherein the media device comprises a panelist meter that is unable to collect media-identifying information from the instrumented media when (i) the instrumented media is provided to the media device via the hypertext transport secure protocol and (ii) the media browser application does not include a browser extension configured to collect media-identifying information associated with encrypted media, wherein encryption of the media prevents the panelist meter from accessing a payload of packets of the encrypted media, the set of operations comprising:

determining whether the media browser application includes a browser extension configured to collect media-identifying information associated with encrypted media, and in response to the determination being that the media browser application does not include the browser extension configured to collect media-identifying information associated with encrypted media:

requesting a panelist identifier associated with the media device;

detecting a media event based on at least one of the media browser application initializing playout of a video corresponding to the instrumented media, the media device receiving user input corresponding to a selection in the instrumented media, or the media browser application displaying an image corresponding to the instrumented media;

in response to detecting the media event, collecting media-identifying information from the instrumented media;

generating a record including the media-identifying information and the panelist identifier; and transmitting the record to a remote computing system of an audience measurement entity, wherein transmitting the record to the remote computing system reduces the use of storage space on the media device.

6. The method of claim 5, wherein requesting the panelist identifier comprises requesting the panelist identifier from a web server using a web protocol request via a local network of the media device.

7. The method of claim 5, the set of operations further comprising adding a client identifier associated with the instrumented media to the record.

8. The method of claim 5, wherein the selection is a checkout on a webpage, the set of operations further comprising adding a product identifier and a product price associated with the checkout to the record.

9. An apparatus to implement monitoring instructions embedded in instrumented media, the apparatus comprising:
a memory; and
one or more processors communicatively coupled to the memory, the memory including instructions that, when executed by the one or more processors, cause the apparatus to perform operations comprising:
embedding the monitoring instructions into media to generate the instrumented media; and
providing the instrumented media to a media device via a hypertext transport secure protocol for presentation on the media device via a media browser application of the media device, wherein the embedded monitoring instructions, when executed by the media device, cause the media device to perform a set of operations, wherein the media device comprises a panelist meter that is unable to collect media-identifying information from the instrumented media when (i) the instrumented media is provided to the media device via the hypertext transport secure protocol and (ii) the media browser application does not include a browser extension configured to collect media-identifying information associated with encrypted media, wherein encryption of the media prevents the panelist meter from accessing a payload of packets of the encrypted media, the set of operations comprising:
determining whether the media browser application includes a browser extension configured to collect media-identifying information associated with encrypted media, and
in response to the determination being that the media browser application does not include the browser extension configured to collect media-identifying information associated with encrypted media:
requesting a panelist identifier associated with the media device;
detecting a media event based on at least one of the media browser application initializing playout of a video corresponding to the instrumented media, the media device receiving user input corresponding to a selection in the instrumented media, or the media browser application displaying an image corresponding to the instrumented media;
in response to detecting the media event, collecting media-identifying information from the instrumented media;
generating a record including the media-identifying information and the panelist identifier, and
transmitting the record to a remote computing system of an audience measurement entity, wherein transmitting the record to the remote computing system reduces the use of storage space on the media device.

10. The apparatus of claim 9, wherein requesting the panelist identifier comprises requesting the panelist identifier from a web server using a web protocol request via a local network of the media device.

11. The apparatus of claim 9, the set of operations further comprising adding a client identifier associated with the instrumented media to the record.

12. The non-transitory computer readable storage medium of claim 1, wherein collecting the media-identifying information from the instrumented media comprises processing the instrumented media to extract the media-identifying information from the instrumented media as metadata.

13. The method of claim 5, wherein collecting the media-identifying information from the instrumented media comprises processing the instrumented media to extract the media-identifying information from the instrumented media as metadata.

14. The apparatus of claim 9, wherein collecting the media-identifying information from the instrumented media comprises processing the instrumented media to extract the media-identifying information from the instrumented media as metadata.

15. The non-transitory computer readable storage medium of claim 1, the set of operations further comprising:
determining that the instrumented media was provided to the media device via the hypertext transport secure protocol,
wherein at least the requesting, the detecting, the collecting, and the generating of the set of operations are performed in response to the determination that the instrumented media was provided to the media device via the hypertext transport secure protocol.

16. The method of claim 5, the set of operations further comprising:
determining that the instrumented media was provided to the media device via the hypertext transport secure protocol,
wherein at least the requesting, the detecting, the collecting, and the generating of the set of operations are performed in response to the determination that the instrumented media was provided to the media device via the hypertext transport secure protocol.

17. The apparatus of claim 9, the set of operations further comprising:
determining that the instrumented media was provided to the media device via the hypertext transport secure protocol,
wherein at least the requesting, the detecting, the collecting, and the generating of the set of operations are performed in response to the determination that the instrumented media was provided to the media device via the hypertext transport secure protocol.

* * * * *